(12) United States Patent
He et al.

(10) Patent No.: US 11,190,953 B2
(45) Date of Patent: Nov. 30, 2021

(54) APPARATUS AND METHOD USING MOBILE SENSOR BASED BEAM STEERING CONTROL

(71) Applicant: Futurewei Technologies, Inc., Plano, TX (US)

(72) Inventors: Xiaoyin He, San Diego, CA (US); Ping Shi, San Diego, CA (US); Ricky Lap Kei Cheung, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 384 days.

(21) Appl. No.: 15/847,703

(22) Filed: Dec. 19, 2017

(65) Prior Publication Data

US 2019/0150003 A1    May 16, 2019

Related U.S. Application Data

(60) Provisional application No. 62/585,152, filed on Nov. 13, 2017.

(51) Int. Cl.
*H04W 16/28*    (2009.01)
*H04B 7/08*    (2006.01)
(Continued)

(52) U.S. Cl.
CPC ......... *H04W 16/28* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS 7,633,442 B2    12/2009 Chiang et al.
10,264,471 B2    4/2019 Qiao et al.
(Continued)

FOREIGN PATENT DOCUMENTS

CN    1866620 A    11/2006
CN    101867401 A    10/2010
(Continued)

OTHER PUBLICATIONS

He et al., "Phased Array Antenna System for Fast Beam Searching," Filed Feb. 14, 2018, 39 pages.
(Continued)

*Primary Examiner* — Whitney Moore
(74) *Attorney, Agent, or Firm* — Vierra Magen Marcus LLP

(57) ABSTRACT

The disclosure relates to technology beam steering in which one or more antennas are configured to form a beam directed to a first beam direction based on a configuration corresponding to an environment. A change in direction of the beam is identified in response to a change in orientation of user equipment, the change in orientation determined via one or more sensors in the user equipment, and a second beam direction is calculated based on a the first beam direction and the change in orientation of the user equipment. The one or more antennas are then configured by steering the beam to the second beam direction to compensate for the change in orientation of the user equipment.

24 Claims, 12 Drawing Sheets

(51) Int. Cl.
    *H04B 7/06*     (2006.01)
    *H04W 24/10*    (2009.01)
    *H04B 7/10*     (2017.01)

(52) U.S. Cl.
    CPC ............ *H04B 7/086* (2013.01); *H04B 7/088* (2013.01); *H04W 24/10* (2013.01); *H04B 7/10* (2013.01)

(56) References Cited

U.S. PATENT DOCUMENTS

| | | | |
|---|---|---|---|
| 10,299,175 | B2 | 5/2019 | Weber et al. |
| 2006/0111056 | A1 | 5/2006 | Dutta |
| 2011/0260919 | A1 | 10/2011 | Montag et al. |
| 2013/0157578 | A1 | 6/2013 | Nanda et al. |
| 2015/0264583 | A1* | 9/2015 | Sundstrom ............ H04W 16/28 342/373 |
| 2016/0150591 | A1 | 5/2016 | Tarighat Mehrabani et al. |
| 2016/0164174 | A1 | 6/2016 | Kullstam |
| 2016/0261308 | A1 | 9/2016 | Khojastepour et al. |
| 2016/0373938 | A1 | 12/2016 | Chen et al. |
| 2017/0074962 | A1 | 3/2017 | Badawy et al. |
| 2017/0194706 | A1* | 7/2017 | Lee ............... H04B 7/0619 |
| 2018/0048382 | A1 | 2/2018 | DiNallo et al. |
| 2018/0107441 | A1* | 4/2018 | Aurongzeb ........... G06F 3/1423 |
| 2018/0262258 | A1 | 9/2018 | Kumagai |

FOREIGN PATENT DOCUMENTS

| | | |
|---|---|---|
| CN | 104683540 A | 6/2015 |
| CN | 105826654 A | 8/2016 |
| CN | 106534473 A | 3/2017 |
| CN | 106549697 A | 3/2017 |
| CN | 106888045 A | 6/2017 |
| CN | 107124196 A | 9/2017 |

OTHER PUBLICATIONS

Office Action dated Jan. 6, 2020 in U.S. Appl. No. 15/896,993.
International Search Report dated Jan. 17, 2019, in PCT Patent Application No. PCT/CN2018/112291, 10 pages.
Response to Office Action dated Apr. 6, 2020 in U.S. Appl. No. 15/896,993.
Notice of Allowance dated Jul. 2, 2020 in U.S. Appl. No. 15/896,993.
Office Action dated Feb. 4, 2021, Chinese Patent Application No. 201880072759.7.
Search Report in Chinese Office Action dated Feb. 4, 2021, Chinese Patent Application No. 201880072759.7.
Office Action dated Aug. 13, 2021, Chinese Patent Application No. 201880072759.7.

* cited by examiner

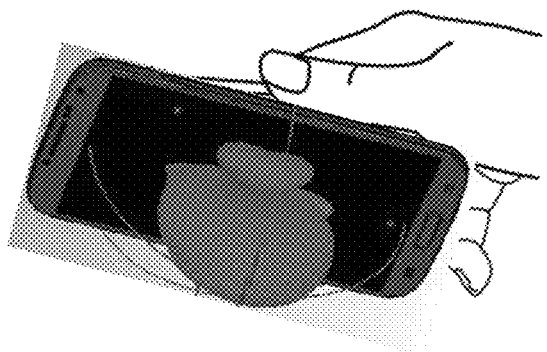
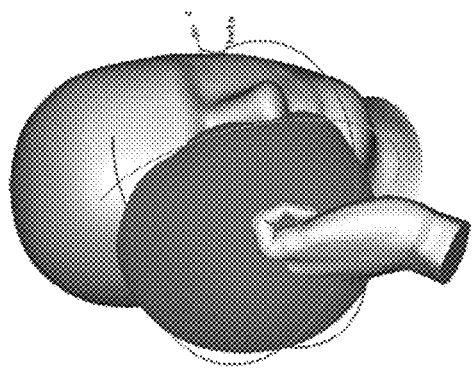
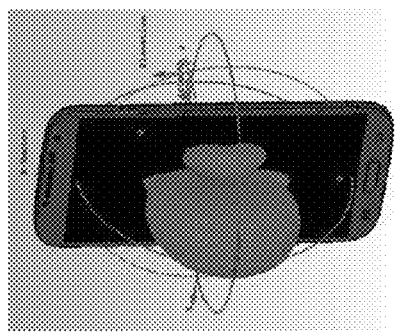
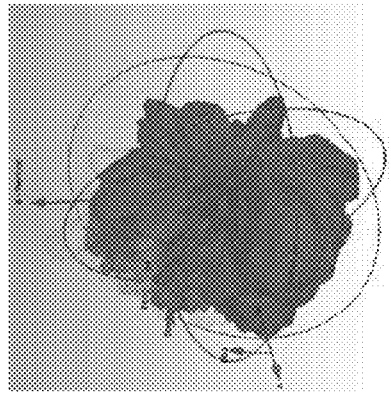
FIG. 7A
FIG. 7B
FIG. 7C
FIG. 7D

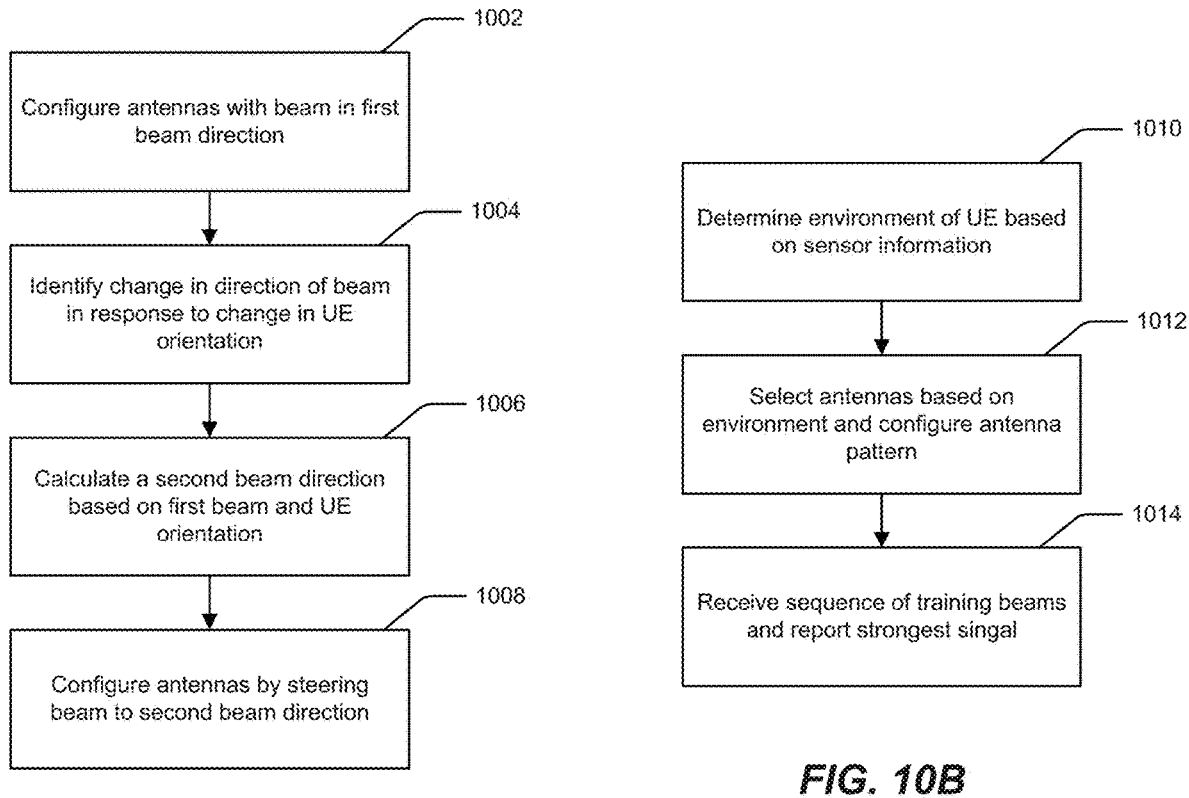
FIG. 10A
FIG. 10B
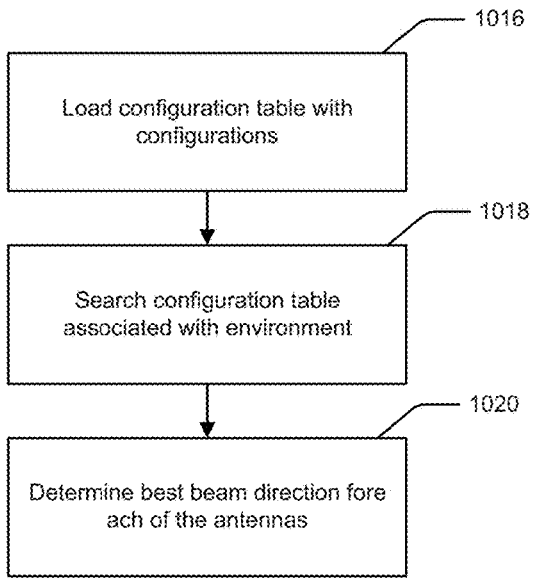
FIG. 10C

APPARATUS AND METHOD USING MOBILE SENSOR BASED BEAM STEERING CONTROL

CLAIM FOR PRIORITY

This application claims the benefit of priority to U.S. Provisional Application No. 62/585,152, filed Nov. 13, 2017, the entire contents of which are hereby incorporated by reference.

FIELD

The disclosure generally relates to beam steering of phased array antenna, and in particular, to beam steering using information provided by sensors inside of user equipment to compensate for movement.

BACKGROUND

Advanced wireless communication systems and devices employ highly directional antenna systems to improve antenna gain, using, for example, millimeter wave (mm-Wave) communication such as 5G NR and 802.11 ad/ay. To provide this directionality, the signals that drive the different antennas of the antenna system are weighted differently, for example, in terms of signal phase and amplitude.

Due to the nature of mmWaves, environmental factors significantly impact the transmission of the signals during beamformed communication. In beamformed communication, beam steering which changes the direction of the main lobe of a radiation pattern of the phased array antenna, is used in aligning and tracking the beam (main lobe of the radiation pattern) from transmitter and receiver. Once the tracking of a beam is lost, the beam forming protocol will require time to re-establish the radio link in the communication environment, if the misaligned beam cannot provide the required link budget. To avoid this from occurring, it is necessary to address operating conditions that may affect the ability of devices communicating with one another via a beamformed link. For example, if a mobile device in communication with a base station is moved, the beam used by mobile device may no longer be directed toward the tracked beam from the base station. In another case, an external object may interfere with a phased array antenna (e.g., a hand is placed on the mobile device of a user), changing how the beam is formed and how well the beam is tracked.

BRIEF SUMMARY

According to one aspect of the present disclosure, there is provided a method for beam steering, including configuring one or more antennas to form a beam directed to a first beam direction based on a configuration corresponding to an environment; identifying a change in direction of the beam in response to a change in orientation of user equipment, the change in orientation determined via one or more sensors in the user equipment; calculating a second beam direction based on a the first beam direction and the change in orientation of the user equipment; and configuring the one or more antennas by steering the beam to the second beam direction to compensate for the change in orientation of the user equipment.

Optionally, in any of the preceding aspects, the method further including determining the environment of the user equipment based on sensor information provided by the one or more sensors in the user equipment; selecting the one or more antennas based on the environment and forming a receiving beam by configuring a radiation pattern of the selected one or more antennas; and receiving signals from a sequence of training beams from base station on the selected one or more antennas and reporting the signal strengths of training beams back to base station.

Optionally, in any of the preceding aspects, the method further including searching a configuration table associated with the environment for beam directions of the one or more antennas, loading a configuration for the one or more antennas associated with the beam direction; and determining a best beam direction for each of the one or more antennas based on at least one of signal quality or strength.

Optionally, in any of the preceding aspects, the information provided by the one or more sensors identifies which of the one or more antennas on the user equipment are adversely affected by a surrounding environment, such that a performance level change of the one or more antennas is identified.

Optionally, in any of the preceding aspects, the performance level change corresponds to a new configuration for the one or more antennas and is reflected to the configuration table associated with the environment.

Optionally, in any of the preceding aspects, the information provided by the one or more sensors identifies which of the one or more antennas on the user equipment are blocked such that the performance level falls below a threshold.

Optionally, in any of the preceding aspects, configuring the one or more antennas to form a beam includes configuring a relative phase shift and gain of signals associated to each of the one or more antennas, and configuring the one or more antenna to the second beam direction includes switching from the one or more antennas to another of the one or more antennas.

Optionally, in any of the preceding aspects, the one or more sensors are at least one of proximity sensors, impedance sensors and radar sensors.

Optionally, in any of the preceding aspects, the best beam direction is determined for a phase-shifter and an amplifier gain for each of the element antenna in one or more phased array antennas.

Optionally, in any of the preceding aspects, the method further including updating the configuration for the one or more antennas to include the second beam direction corresponding to the environment.

According to one aspect of the present disclosure, there is provided a device for beam steering, including a non-transitory memory storage comprising instructions; and one or more processors in communication with the memory, wherein the one or more processors execute the instructions to configure one or more antennas to form a beam directed to a first beam direction based on a configuration corresponding to an environment; identify a change in direction of the beam in response to a change in orientation of user equipment, the change in orientation determined via one or more sensors in the user equipment; calculate a second beam direction based on a the first beam direction and the change in orientation of the user equipment; and configure the one or more antennas by steering the beam to the second beam direction to compensate for the change in orientation of the user equipment.

According to one other aspect of the present disclosure, there is provided A non-transitory computer-readable medium storing computer instructions for beam steering, that when executed by one or more processors, cause the one or more processors to perform the steps of configuring one or more antennas to form a beam directed to a first beam direction based on a configuration corresponding to an environment; identifying a change in direction of the beam in response to a change in orientation of user equipment, the change in orientation determined via one or more sensors in the user equipment; calculating a second beam direction based on a the first beam direction and the change in orientation of the user equipment; and configuring the one or more antennas by steering the beam to the second beam direction to compensate for the change in orientation of the user equipment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 7A-7D illustrate the environmental impact on antenna performance and radiation patterns emitted from user equipment.

FIGS. 10A-10C illustrate flow diagrams of beam steering according to various aspects of the disclosed embodiments.

DETAILED DESCRIPTION

Figure 1:
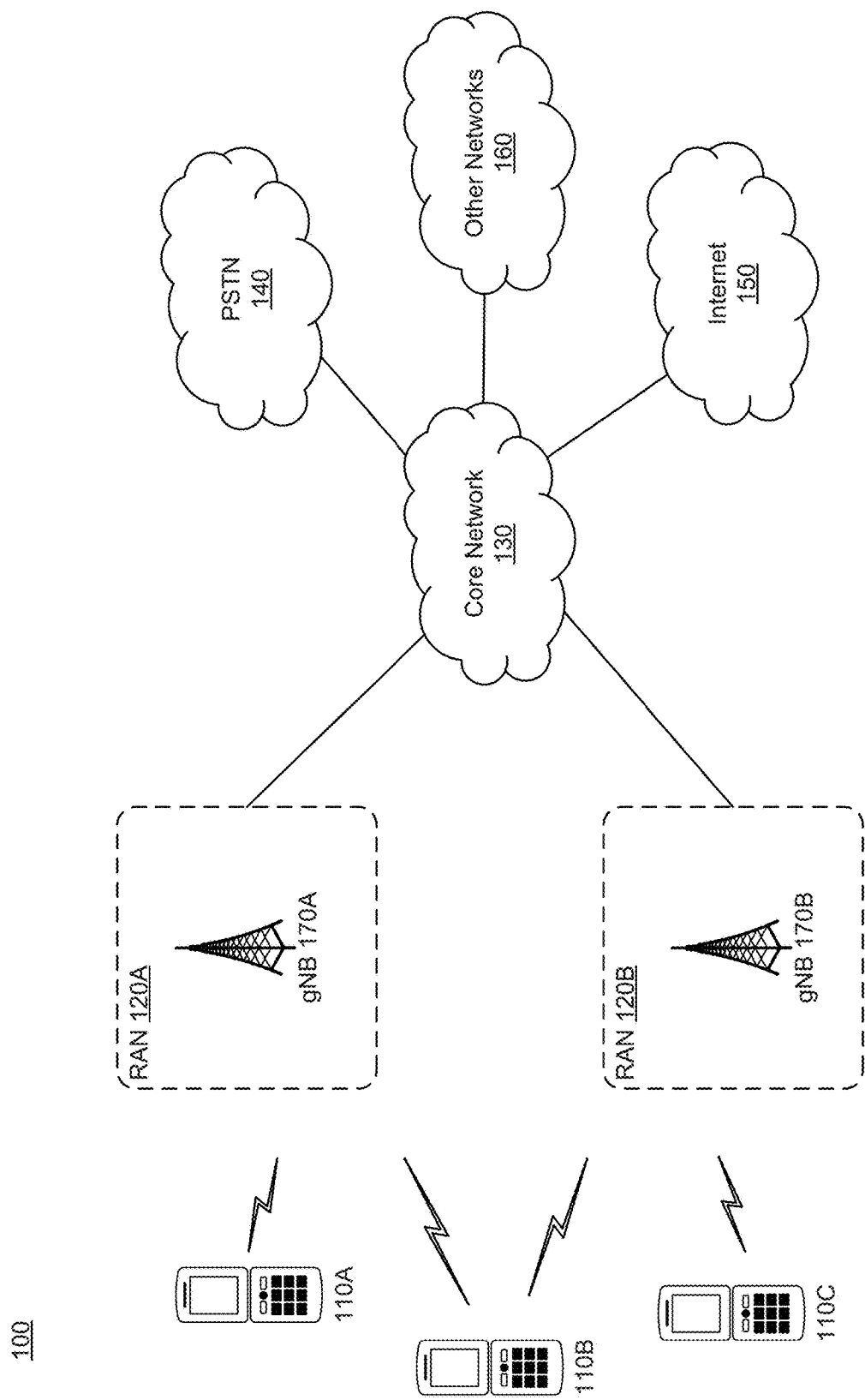
FIG. 1 illustrates a wireless network for communicating data.

The disclosure relates to technology for beam steering of a phased array antenna system, and in particular, to beam steering in highly directional antenna systems in which sensors are employed to detect movement of a user device.

Phased array antenna beam forming and beam alignment are fundamental techniques employed in mobile millimeter wave band communication. Reducing the beam search and alignment time during the signal acquisition stage and maintaining beam tracking during connected mode improve user experience. Using information provided by motion and proximity sensors inside the user equipment, beam acquisition time can be reduced and beam tracking performance can be enhanced. As a result, network resource use efficiency improves and mobile power consumption may be reduced.

The technology in this disclosure uses beam steering in highly directional antenna systems to reduce signal acquisition time and improve tracking performance by employing sensors in the user equipment to provide information about changes in orientation (movement) of the user equipment. In particular, a configuration table that is used to steer the beam of a phased array antenna system may be used to identify and track the incoming beam from base station, after the beams from base station and from the user equipment are aligned for best performance (e.g., best signal strength or signal quality). For an incoming beam from the base station, the best beam from user equipment depends on a particular environment (e.g., use case scenarios in which certain antennas may be blocked or detuned). A configuration table is created for each particular environment. The sensors effectively predict a new environment (use case scenario change) or movement (orientation change) of the user equipment. A new configuration table will be loaded and used for the phased array antenna control when a environmental change is detected by the sensors. Based on an orientation change of the user equipment and the original beam direction, the user equipment will steer the beam to the original beam direction by updating the phased array antenna configuration according to the configuration table.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
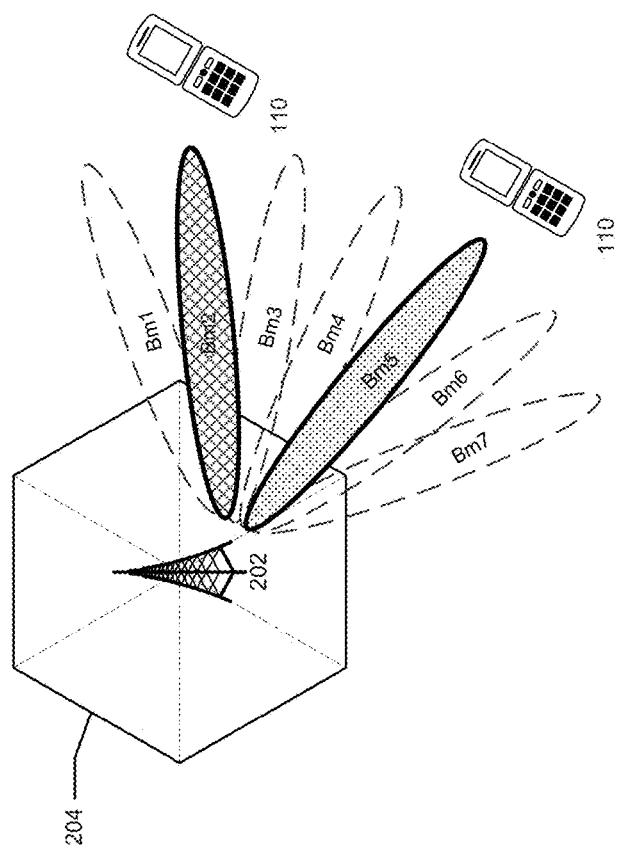
FIG. 2 illustrates a base station with transmitting and receiving beams according to an example embodiment.

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes, such as digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7, and is described in more detail with reference to FIGS. 4A and 4B.

The base station 202 may include, or may be associated with, one or more antennas (not shown) configured for transmitting and/or receiving wireless communication signals, blocks, frames, transmission streams, packets, messages and/or data. In one embodiment, the antennas may include an antenna array configured for generating one or more directional beams, for example, for communicating over one or more beamformed links.

In other embodiments, the antennas may include any other antenna configurations, structure and/or arrangement of one or more antenna elements, components, units, assemblies and/or arrays. For example, the antennas may include a phased array antenna, an omni-directional antenna, a single element antenna, a multiple element antenna, a set of switched beam antennas, and/or the like. The antenna array may include one or more antenna elements, which may be configured, for example, for creating a highly directional antenna pattern. The antenna elements may be placed, for example, in an array, e.g., a two-dimensional array, of a predefined geometry or may be configured to form one or more highly directive antenna patterns or beams, which may be steered by setting appropriate signal phases at the antenna elements and/or by baseband processing.

In still another embodiment, a dual polarized element may be employed. Here, a single element of an antenna array may contain multiple polarized antennas. Multiple elements may be combined together to form an antenna array. The polarized antennas may be radially spaced. For example, two polarized antennas may be arranged perpendicularly, corresponding to a horizontally polarized antenna and a vertically polarized antenna.

In some embodiments, base station 202 may be configured to control the antenna array to generate and steer one or more beams to be directed to one or more other devices, e.g., UE 110.

In other embodiments, the base station 202 and UE 110 may utilize the mmWave communication band to provide wireless connectivity for a relatively large coverage area.

User equipment (UE), such as user equipment 110A-110C (FIG. 1), located within the cell of the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality of a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
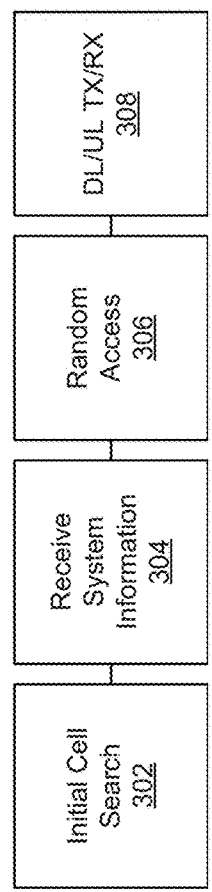
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (HG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB and acquires a cell Identifier (ID) and other information by receiving a Primary Synchronization Channel (P-SCH) and a Secondary Synchronization Channel (S-SCH) from the gNB 202. Subsequently, the user equipment may acquire information broadcast in the cell by receiving a Physical Broadcast Channel (PBCH) from the gNB 202. During the initial cell search, the user equipment may monitor a downlink (DL) channel state by receiving a downlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A 110C initially accesses the gNB 202 or has no radio resources for signal transmission to the gNB 202, the user equipment 110A 110C may perform a random access procedure at 306 with the gNB 202.

Upon completion of the above process, the user equipment 110A-1100 may receive a PDCCH and/or a PDSCH from the gNB 202 and transmit a Physical Uplink Shared Channel (PUSCH) and/or a PUCCH to the gNB 202, which is a general DL and UL signal transmission procedure at 308.

Specifically, the user equipment 110A-110C receives Downlink Control Information (DCI) on a PDCCH. The DCI includes, for example, control information such as resource allocation information for the user equipment 110A-110C.

Control information that the user equipment 110A-110C transmits to the gNB 202 on the uplink (UL) channel or receives from the gNB 202 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQI, a PMI, an RI, etc., may be transmitted on a PUSCH and/or a PUCCH.

Figure 4:
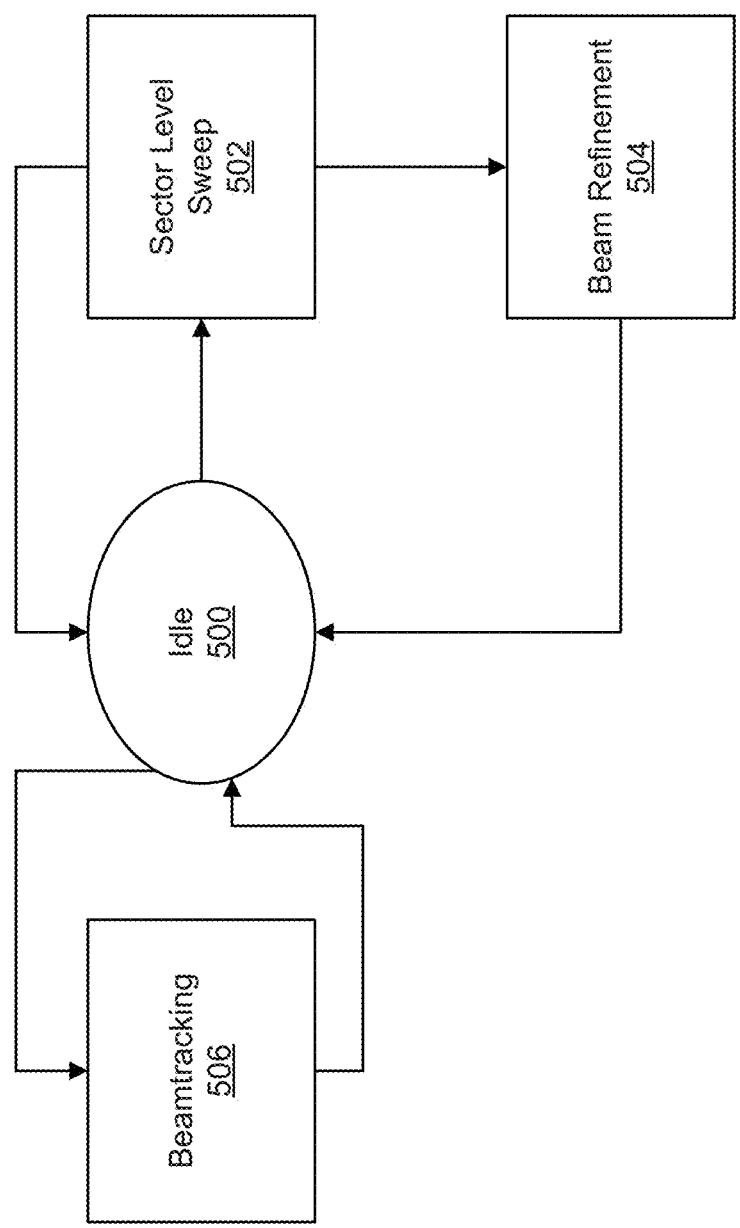
FIG. 4 illustrates one embodiment of a state diagram for user equipment.

FIG. 4 illustrates one embodiment of a state diagram for user equipment. The state diagram illustrates state transitions 500 for adaptive beam forming using phased array antennas as described above. In the illustrated embodiment, the UE, such as UE 110, may be in an idle state 500. However, the UE 110 may detect a base station, such as gNB 202, within communication range and subsequently may exit the idle state 500 and enter another state, such as an acquisition state. In this state, for example, a sector level sweep (SLS) module 502 and beam refinement module 504 may initiate beamforming and setup such that the idle state 500 changes to a connected state (not shown). Various sensors within these modules may detect, for example, the proximity of the human body to the UE110 and assist the UE 110 in selecting the proper phased array antennas. Similarly, a beam tracking module 506 may have sensors for motion detection and estimation to assist in the beam tracking.

During beamforming training, a sequence of training symbols/frames using a sector sweep (beam sweep over different directions) provides the necessary signals to allow each device to determine appropriate antenna system settings for both transmission and reception. After the successful completion of beamforming training, a communication (e.g., millimeter-wave) may be established.

In particular, the beamforming may include an beam sweep/sector level sweep (SLS) stage (implemented by SLS module 502) and a subsequent beam refinement stage (implemented by beam refinement module 504). In the beam sweep/SLS stage, the UE 110 conducts a receive sector sweep, while monitoring the transmit sector sweep of the system information by the base station. A sector generally refers to either a transmit antenna pattern or a receive antenna pattern corresponding to a particular sector ID and is directly related to phased array antenna configuration. This stage typically concludes after an initiating UE 110 sends out the sector sweep report and receives sector sweep feedback from base station, and sends an acknowledgement, during which both gNB 202 and UE 110 communicate with each other with the desired sector and beam.

A beam refinement stage can be included to further improve beam forming. During the beam refinement stage, the UE 110 can sweep over a sequence of transmissions, in which the antenna configuration at the transmitter or receiver can be changed between transmissions, culminating in the exchange of final beam refinement feedback. Thus, the beam refinement stage allows a UE 110 to improve its antenna configuration both for transmission and reception.

However, the initial antenna configuration may change due to any substantial change in the propagation channel and relative motion between the UE 110 and the gBN 202. To prevent this from occurring, the optimum pair of beams between the UE 110 and gNB 202 may be maintained by constantly updating the beam based on the continuous channel measurement and beam refinement. This process is referred to as beam tracking and may be implemented by beam tracking module 506.

Beam tracking enables directional communications between devices while subject to radio channel changes, relative motion and orientation data changes and follows initial beam acquisition, as noted above. The aim of the beam tracking function is to adapt the transmission and reception beam patterns at both ends of a communication link, starting from the initial beamforming training configuration.

To aid in implementing the sector level sweep, beam refinement and beam tracking, the system may employ various sensors. For example, one or more sensors (not shown) may include, but are not limited to, capacitive proximity sensors, a light proximity sensor, an accelerometer, a magnetometer and a gyroscope. In one embodiment, a processor can be coupled to any one or more of the sensors via any electronic communication medium, including a data bus, a serial data link, or other electric circuit.

Proximity sensors, such as a capacitive proximity sensor, utilize capacitive sensing to detect anything conductive or having dielectric properties different from air. In certain embodiments, capacitive proximity sensors are located on the top, bottom left and right sides of the UE 110. In this respect, the capacitive proximity sensors detect present capacitance on opposing sides of the user equipment. The detected capacitance is indicative, for example, of whether and how a user handles the user equipment. For example, and with reference to the illustrations in FIGS. 7A-7C (described further below), the capacitance indicates whether and how the user equipment is held. The UE 110 may be held for example in a left or right hand (FIGS. 7B and 7C respectively showing the front and back radiation patterns), not held at all by a user (FIG. 7A showing radiation patterns), and may also be distinguished by fingers, palm and thumb (not shown). In another embodiment, the capacitive touch screen can be collectively used to detect the proximity of human body (face), or detect the hand grip in other configuration.

A light proximity sensor is another type of sensor that may be coupled to the UE 110. The light proximity sensor emits (infrared) light and detect the reflected light, thus derive distance information to the reflector. The sensor is typically placed on the top front side of the UE 110 that would be nearest a user's head when in use. The sensor detects the proximity of a user's head to the UE 110 such that as the UE 110 is held nearer to the user's head.

An accelerometer may also be in the UE 110 and is configured to detect acceleration of the UE 110 in at least one dimension. Orientation of the UE 110 can be measured according to the detected acceleration. A typical 3-axis accelerometer will provide tilt information and the acceleration of the UEs.

A magnetometer may also be in the UE 110 and measures the magnetic field—either from the magnetization of a magnetic material like a ferromagnet, or the magnetic field at a particular location from earth's magnetic core. For example, a compass is a simple type of magnetometer, one that measures the direction of an ambient magnetic field. Magnetic field information could be used to calibrate the device orientation.

A Gyroscope is another type of sensor that may be in the UE 110 and may be used to measure the orientation and angular velocity of an object. For example, using a 3-axis gyroscope, the rate of rotation along the three axis may be determined.

In another example, GPS coordinates may be used to track the movement of UE 110, using GPS based sensors. Coordinates may be obtained using GPS, Assisted-GPS (A-GPS) or the like. The indoor/outdoor information, speed and location information from GPS sensor may be used to determine the beam acquisition and beam tracking strategy. In one embodiment, the location of UE 110 may be established within a smaller range as the base station may filter the directional signal strength measurements received based on the GPS coordinates or time/speed information.

It is appreciated that the sensors described above are non-limiting, and that any number of different sensors may be employed.

Figure 5B:
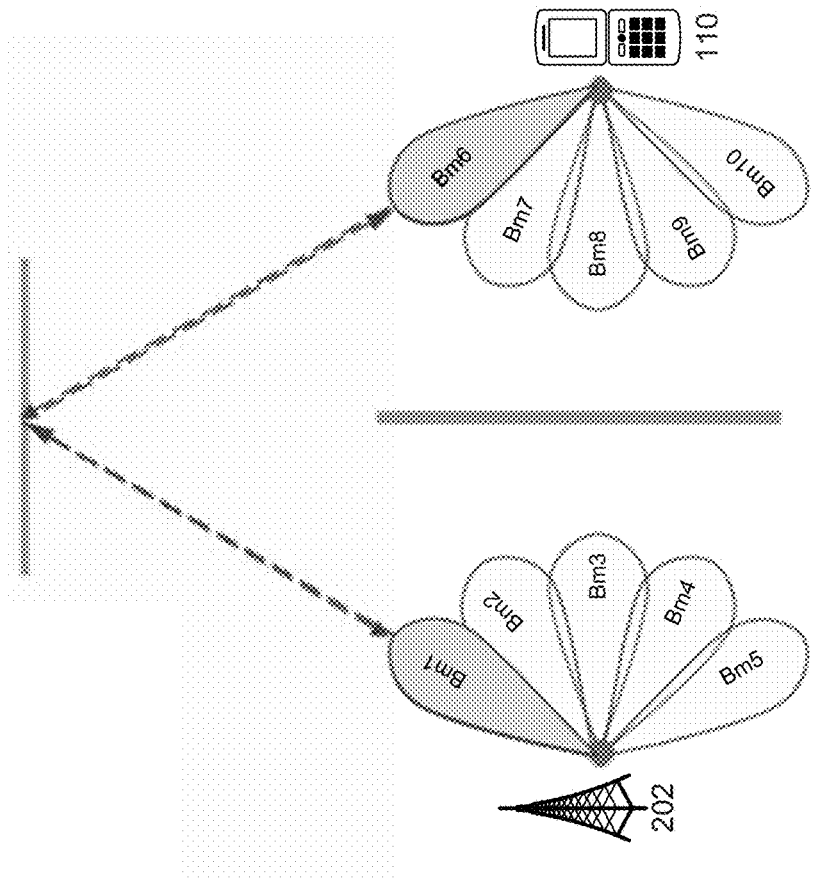
FIGS. 5A 5C illustrate a beam acquisition and tracking sequence between a base station and user equipment.
Figure 5A:
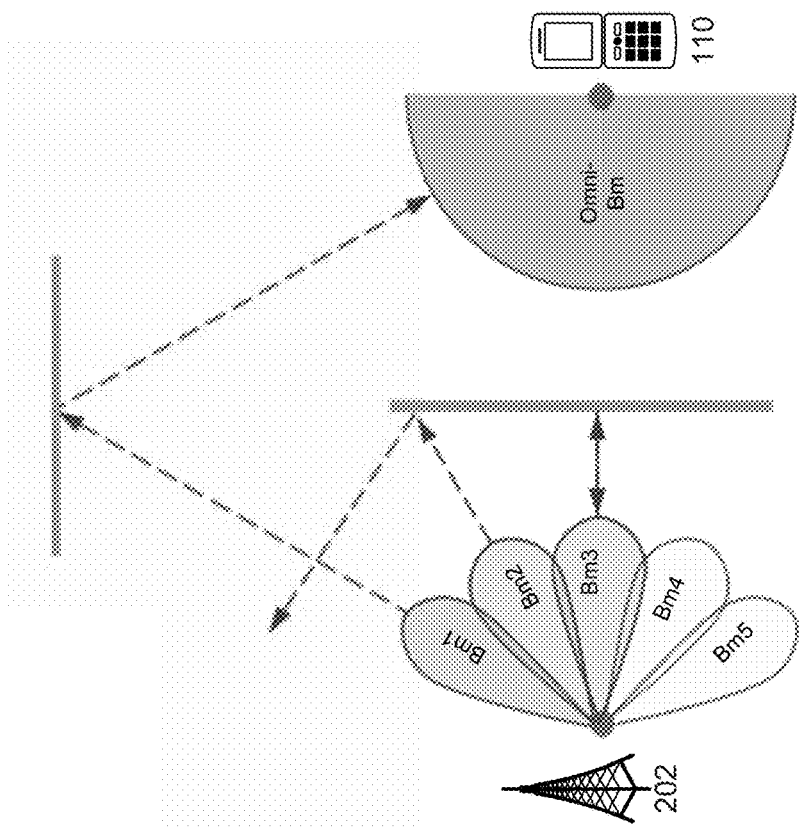
Figure 5C:
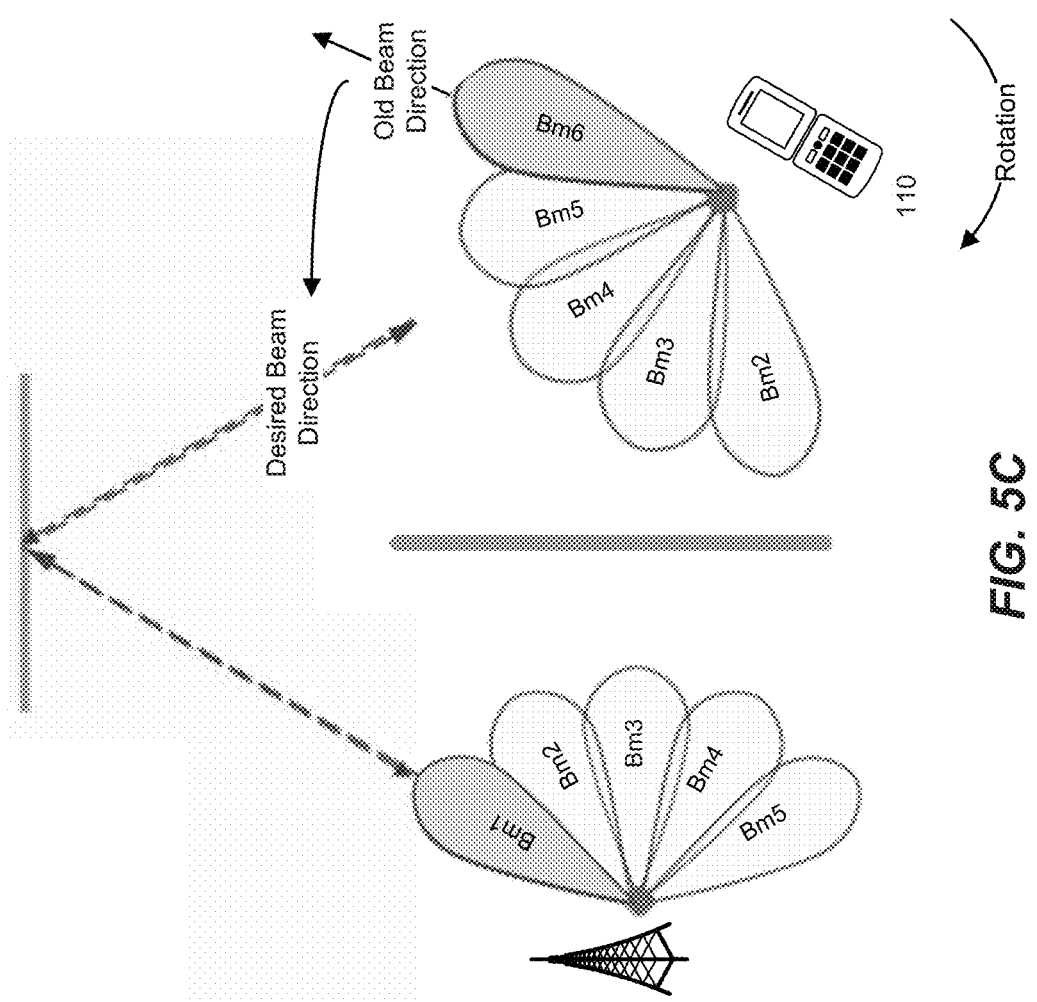

FIGS. 5A 5C illustrate a beam acquisition and tracking sequence between a base station and user equipment. Communication systems, such as those depicted in the example embodiments, using highly directional beams (e.g., mmWave communication) BM1-BM5 of base station 202 and BM6-BM10 of UE 110 require their beams to be oriented such that they point towards each other. This process is generally referred to as beam acquisition. Beam acquisition establishes the initial beam configuration between corresponding devices (e.g., base station 202 and user equipment 110), enabling them to initiate communications, as briefly noted above.

As shown in FIG. 5A, base station (e.g., gNB 202) may initially transmit directional beams BM1-BM5 which may also be identified as sectors. As beams are transmitted by the gNB 202, some may reach the UE 110 while others may be blocked or diverted due to interference. For example, beams BM2 and BM3 are diverted and reflect off of walls in a direction away from the UE 110, while BM1 reflects off of a wall and is diverted to the UE 110. For beams (e.g., BM1) propagating toward sectors in which the UE 110 is located, a UE 110 receives the transmitted beam BM1. In the illustrated example, the beam BM1 is received using an omni-directional beam antenna (it is appreciated that omni-directional beam antenna is used for purposes of the example and is non-limiting). If there are more than one beams available from UE side, each beam will be used to identify the beam from the base station. For example, as depicted in FIG. 5B, for each beam (Bm6-Bm10) of UE 110, a transmitter will sweep over all available beams (Bm1-Bm5) before a final beam measurement report is completed.

One embodiment of beam acquisition employs an iterative training scheme. An iterative training process utilizes training sequences and feedback in successive iterations in order to train transmitters or receivers. The iterative training approach provides the advantage of distributing transmit power to multiple power amplifiers, and the beam can be adaptively steered. Other acquisition techniques may also be employed including, but not limited to, an exhaustive search and context information (CI) based search.

In FIG. 5B, the gNB 202 and UE 110 are in beam alignment (as depicted by broken arrows) after the initial acquisition of the signal. However, the initial antenna configuration may be rendered non-optimal due to radio channel condition change and relative motion between the communicating devices sometime after acquisition. Therefore, the optimum pair of beams between the gNB 202 and UE 110 may be improved by being constantly updated based on the received signal quality of various reference signals. This process is called beam tracking and is usually a simpler procedure than initial beam acquisition, with the beam search space restricted to a few candidates that are closely related to the last known optimum beam, as will be described in more detail below.

As shown in FIG. 5C, beam tracking enables directional communications between devices while subject to relative motion and device orientation changes. This follows the initial beam acquisition, where initial beam alignment between the gNB 202 and UE 110 is determined. The aim of the beam tracking function is to adapt the transmission and reception beam patterns at both ends of a beamformed link, starting from the initial trained beamforming configuration. For example, the orientation of UE 110 has rotated such that the old (prior) beam direction BM6 (in this case, determined during initial acquisition) is no longer aligned with the desired beam direction (the old beam direction BM6 as shown in FIG. 5B). Rotation and changes in orientation are described in more detail in FIGS. 6A and 6B below.

Figure 6B:
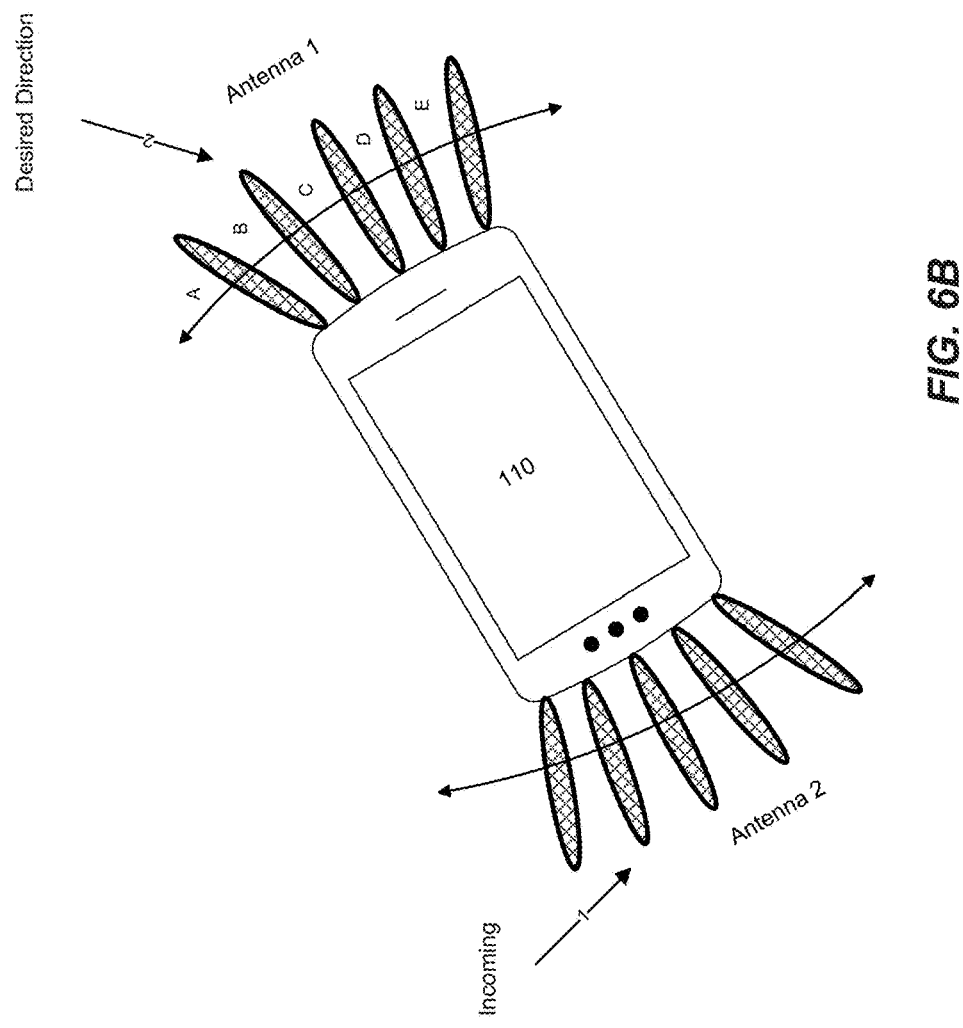
FIGS. 6A and 6B illustrate beam tracking user equipment to compensate for movement.
Figure 6A:
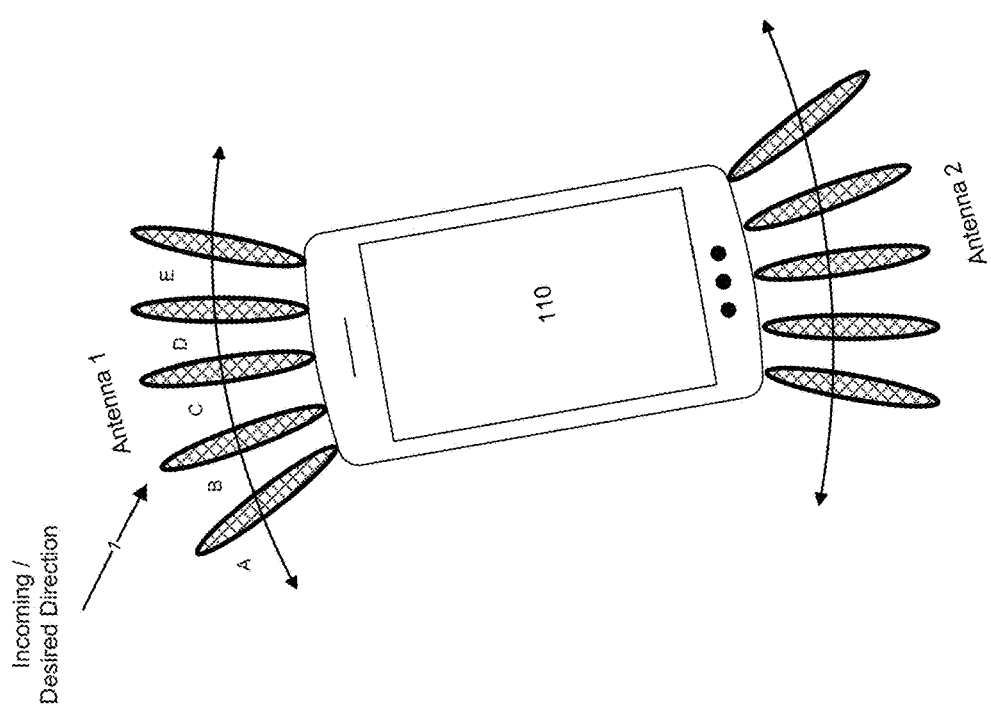

FIGS. 6A and 6B illustrate beam tracking user equipment to compensate for movement. Small changes in the position/orientation of the UE 110 can result in significant changes to data rates, as the link is highly directional. For example, a user streaming data may experience a change in signal quality due to a small change in location or limited movement in a particular direction. Likewise, as discussed with reference to FIGS. 7A-7D below, hand or body placement disturbs radiation patterns and may result in detuned antennas, thereby affecting the performance of the antenna array. The UE 110 may enter a discontinuous transmitting/receiving state by temporarily turning off the receiver and going to sleep, and therefore unable to track the beam from the base station (gNB 202). Upon waking up, the UE 110 may configure the UE beam to the beam direction before going to sleep by using data from the sensors located within the UE 110 (as discussed above) to compensate for the movement of UE 110. The UE 110 may also experience an environment change, such as hand grip or relative location to the human body. Upon detection of the environment change, the UE 110 may load a new configuration table related to the new environment, while configuring the phased array antenna to the same beam direction before the environment change.

The disclosed embodiment provides a non-limiting example of using data from sensors located within a UE 110 (as discussed above) to compensate for the movement of the UE 110 to assist in beam tracking. The UE 110 may use various methods to determine and report its movement and/or change in orientation to the gNB 202. The orientation change signaled by the internal sensors may also be used by UE 110 to maintain its beam orientation towards the beam from gNB 202 by modifying its beam configuration to use an alternative beam or direction or to switch to a different antenna array.

As illustrated, UE 110 (including antenna 1 and antenna 2) remains in an initial position (FIG. 6A). Here, the incoming beam 1 has been tracked by one of desired beam directions A-E. In this case, the desired beam direction is desired direction B at antenna 1. After rotation or movement of the UE 110, such that the position of antenna 1 and antenna 2 also rotate, the incoming beam 1 can only be acquired at antenna 2. In one embodiment, rotation or movement of the UE 110 requires a new desired beam direction without a change (switch) to a different antenna.

In particular, with reference to the embodiment of FIG. 6A, the UE 110 has a beamformed link (with a desired direction 1) with the gNB 202. Here, the beam has been tracked to a desired beam direction 1 at antenna 1. The gNB 202 may also acquire sensor information from the UE 110 over the beamformed link 1 to obtain orientation information, as noted above. In one embodiment, the sensor information may be used to determine which beam would be the "best" to use in the event that the UE 110, including antennas 1 and 2, changes orientation.

As shown in FIG. 6B, after movement or a change in orientation, the UE 110 may adjust its beam with antenna 1 to maintain the beamformed link from a desired direction 1. In another embodiment, UE 110 may maintain its beam with antenna 1 and adjust the beamformed link to a desired direction 2 (tracked by desired beam B) to sustain the communication with the gNB 202 (and notify the gNB 202 of the change). Consequently, the gNB 202 may also update the current beam direction (and optionally an associated configuration table, discussed below) to continue communication with the UE 110.

In one embodiment, if the UE 110 movement or change in orientation is significant (e.g., exceeds a threshold), a different antenna array may be used to continue the connection. For example, in FIG. 6B, the rotation and change in orientation of UE 110 may be significant enough that the desired direction of the beamformed link requires a switch in antennas. When the initial antenna (antenna 1) is no longer directed to the incoming beam, the UE 110 may require a change in antenna arrays from antenna 1 to antenna 2. Switching from the antenna 1 to the antenna 2 may provide the desired gain required to maintain the beamformed link and/or superior link quality.

In one embodiment, and in addition to the directional signal strength measurements and location and orientation information fed back by a UE 110, the gNB 202 may also use historical data (in combination with or without the sensor information) to track the UE 110 such that predictions can be made as to the direction that a UE may travel.

FIGS. 7A and 7B illustrate the environmental impact on antenna performance and radiation patterns emitted from user equipment. As illustrated in the various embodiments, the environment may significantly impact antenna performance. Since the UE 110 may be seriously impacted by how well the device operates under a wide range of operational and/or physical environments, the dynamic radiation pattern shaping and optimization based on information provided by the UE 110, including the sensors and other signal quality parameters, help to maintain signal quality. Understanding the cause of environmental impediments enables the sensors in the UE 110 to adjust and optimize the beamforming link between itself and the gNB 202 to thereby increase signal quality and prevent link failure. For example, if the sensors in UE 110 detect a change in orientation, the antenna array may be reconfigured, switched or existing phase setting for phase shifters may be varied according to a match in polarization between beams.

Turning to FIG. 7A, the embodiment discloses a scenario in which environmental factors do not significantly impact the antenna performance of the UE 110. In the disclosed example, a first antenna array (not shown) is placed on the front side of the UE 110 and a second antenna array (not shown) is placed on the back side of the UE 110. As the environmental factors do not significantly impact antenna performance, the radiation patterns remain largely undisturbed, as illustrated. For example, a free space antenna radiation pattern associated with the UE 110 is illustrated in a usage mode (environment) where the UE 110 is positioned to be unobstructed at a position away from the user.

In one example embodiment, the UE 110 is placed on a surface such as a table, desk, or counter, or in an enclosed space such as a drawer, purse, pocket or protective case. Objects near the UE 110, including users, and the surface or enclosed space, can include one or more materials, each of which can have a specific dielectric constant, and may affect radio waves of the antennas via any of electromagnetic coupling, reflection, refraction, diffraction, absorption, polarization and scattering.

In another embodiment, the UE 110 can detect one or more characteristics of nearby objects such as, for example, its dielectric constant and position relative to the UE 110. In an embodiment, the UE 110 can predict how the objects will affect the performance levels of the antennas. For example, the UE 110 can determine that detected objects are human users based on their dielectric constant and/or changes in their capacitance over time, with a capacitive proximity sensor. In one embodiment, the UE 110 may be configured to predictively tune an antenna based on the detected dielectric constant.

With reference to FIGS. 7B and 7C, environmental factors, such as a hand or a user, impact antenna performance given the location of the hand (and or fingers) obstructing or blocking the first and/or second antennas. As illustrated, the front side of the UE 110 has a radiation pattern that is largely undisturbed by placement of the hand on the back side of the UE 110 (FIG. 7B), such that the radiation pattern is similar to that depicted in the FIG. 7A. However, antenna performance on the back side of the UE 110 proves to impact radiation patterns given the placement of the user hand obstructing/blocking the antenna (FIG. 7C).

Such environmental impact can be derived, for example, from one or more sensor readings from the UE 110. For example, in one embodiment, a processor(s) in the UE 110 can be configured to perform one or more readings, and computations on the readings, from the one or more sensors, in which the processor(s) can be configured to perform the readings and/or computations in response to one or more detected environmental changes. The one or more sensors may serve to detect a characteristic of the environment around the UE 110.

For example, a user may hold the UE 110 in her right hand. Accordingly, the user's hand may affect a characteristic of the UE's 110 antennas such as a radio characteristic of the uplink and/or the downlink. For example, the hand will seriously detune the antenna if the antenna is placed in proximity of the hand. Detuning in this manner could be detected by monitoring the impedance of the antenna, where the impedance of the antenna could be derived by measuring the ratio of forward and reverse power using an impedance detection circuit. In another case, the user's hand may at least partially block the antenna, thus blocking the signal between one or more of the antennas of the UE 110 and an antenna of the gNB 202. In one example, a radar sensor working at the mmWave band can detect this type of change.

In FIG. 7D, the UE's 110 antennas become obstructed/blocked by a user head in addition to being held in a hand. As expected, introducing the head or other additional environmental factors adversely affects the performance level of the antennas. Using the various techniques described herein, changes in the UE 110 environment will trigger a change in the antenna configuration, which may be initiated or determined using the afore-mentioned sensors embedded in the UE 110. For example, the user may be talking on a cell phone in which the proximity of the user's head to the UE 110 may increase the amount of radiation absorbed by the user, which results in a degraded radio performance.

It is appreciated that the impact to antenna performance levels and radiation patterns depicted are merely examples and not intended to be limiting embodiments. Other radiation patterns may be measured or otherwise determined with respect to other environmental factors or scenarios for each antenna.

Figure 8:
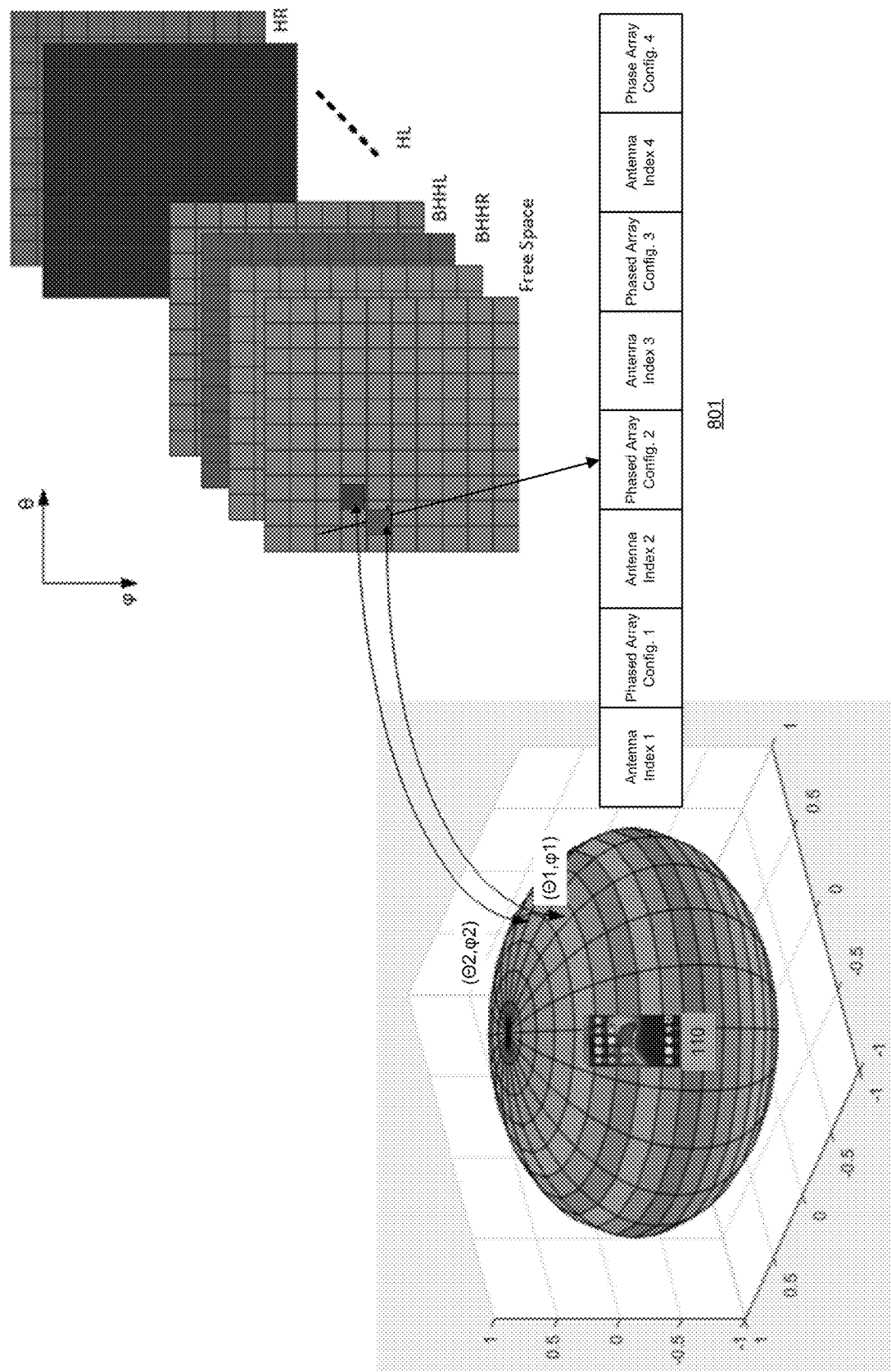
FIGS. 8 and 9 illustrate an example of beam configuration and tracking according to embodiments of the disclosure.
Figure 9:
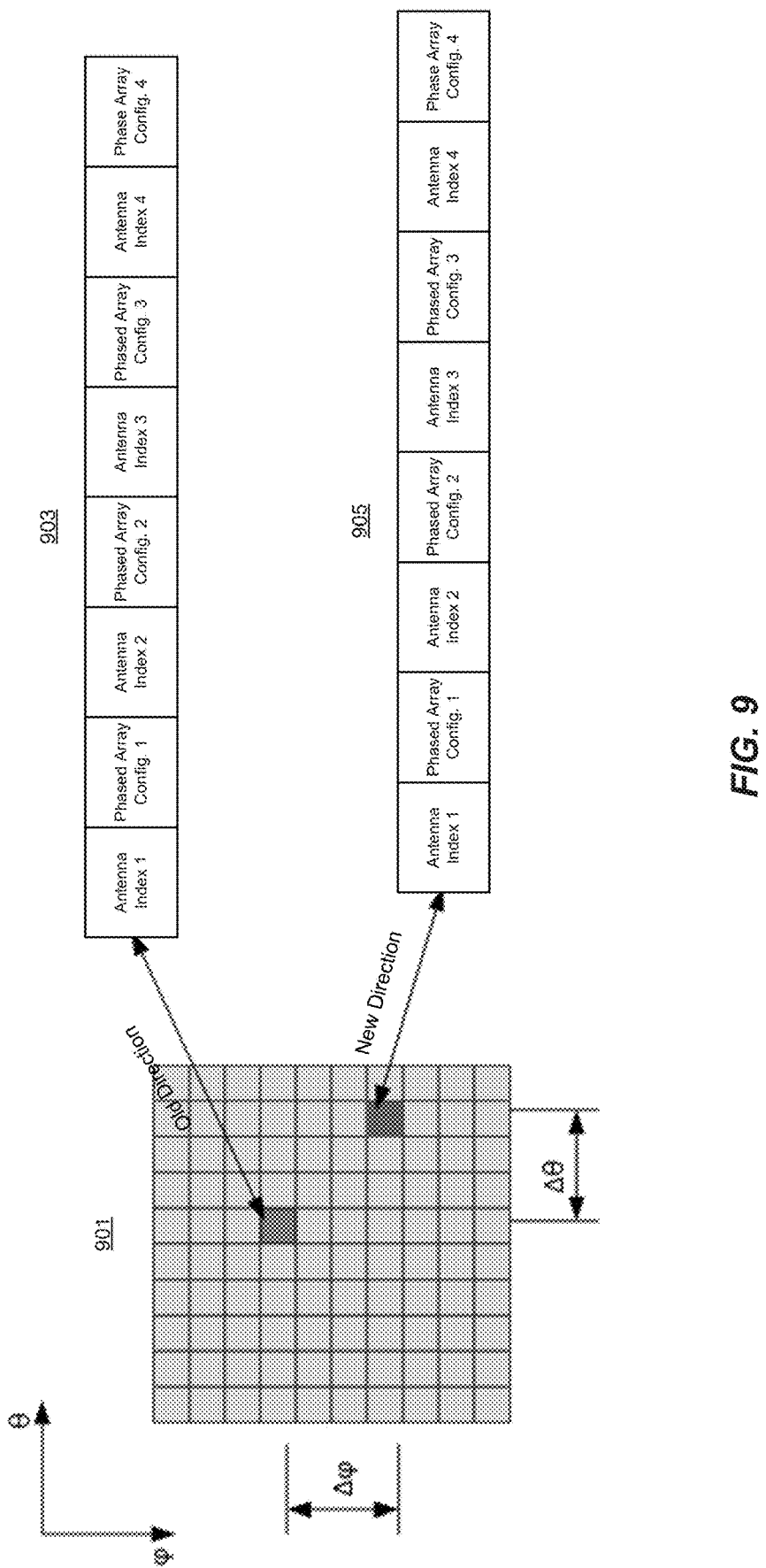

FIGS. 8 and 9 illustrate an example of beam configuration and tracking according to embodiments of the disclosure. In embodiments, the phased array antennas in the user equipment (e.g., UE 110) are characterized according to the antenna environment (or use cases), as determined, for example, by sensors in the UE 110. That is, the phased array antennas may be configured (or re-configured) based on the particular environment in which the UE 110 is operating. Changes in the UE's 110 environment may therefore result in or trigger a change of the phased array antenna configuration (or re-configuration). Configuration information may be stored, for example, in a configuration table 801 that includes the phased array configuration for each antenna in the phased array. In one embodiment, the configuration table is a look-up table that includes indexed antenna information and corresponding phased array configurations according to physical and/or functional use cases (environments) detected by the UE 110. As appreciated, the configuration table 801 may be stored in memory, such as memories 1106, 1156 and 1220, and indexed by processors, such as processor 1106 of the UE 110.

With reference to FIG. 8, UE 110 is depicted in a three-dimensional coordinate system. Beams from the UE 110 are described by two-dimensional coordinates (as represented by the "squares") based on the elevation (θ) and the azimuth (φ). A phased array antenna system for each environment may be characterized by a table indexed by the elevation (θ) and azimuth (φ) angles, mapping to the quantized direction in a coordinate fixed to the UE 110. In the example shown, there are five environments including free space, beside head and hand right (BHHR), beside head and hand left (BHHL), hand left (HL) and hand right (HR). For each direction (θ, φ) relative to the UE 110 in any environment, each of the phase array antenna in the system are analyzed to find the optimum setting for each phase-shifter (delay) and amplifier gain (i.e., determine the best performing phased array antenna in each environment). In the case of the UE 110 having multiple phased array antennas, each phased array antenna can be identified with an antenna index. For each direction relative to the UE 110, an antenna with corresponding phase shifter and amplifier gain setting are selected. In one embodiment, two phased array antenna configurations are selected, one for each polarization. The corresponding configurations are stored in the configuration table 801 for each environment.

For example, for each direction in each environment, the configuration table 801 is configured with configuration information that includes the phased array configuration for each antenna in the phased array. In the example of FIG. 8, the phased array has four (4) antennas such that the configuration table 801 includes four corresponding antenna indices (antenna index 1—antenna index 4) and a phased array configuration (phase array configuration 1—phased array configuration 4). It is appreciated however that any number of environments may exist. Multiple phased array antenna for each direction may be used in diversity operation, or in MIMO configuration to support more than one stream on either transmit or receive direction.

Additionally, for each direction relative to UE 110, there is an optimal (or a list of optimal) phased array antenna setting, the transmit (incoming) beam direction can be identified by the optimum receive beam direction (relative to UE 110) during the acquisition stage, as the UE 110 sweeps through possible receive beams for each transmit training beam sequence. Referring to FIG. 9, the UE 110 beam is tracked and optimized as the UE's 110 orientation changes. As depicted, an environment 901 is shown with an old (original or prior) beam direction and a new beam direction (after a change in UE orientation) and corresponding configuration tables 903 and 905. In particular, during the tracking state, the current phased array antenna system configuration (antenna index, phase array configuration) are correlated with incoming/outgoing beams as determined during the beam search and alignment procedure. The sensors in the UE 110 are then used to predict the orientation of the UE 110 based on a change in the orientation ($\Delta\theta$, $\Delta\varphi$) of the UE 110. Based on the detected change in orientation, the antenna switch state (which antenna array should be used/selected) and phased shifter configuration may be updated based on the configurations in the configuration tables 903 and 905. In one embodiment, if the orientation angle changes such that it exceeds a limit/threshold, the antenna and phased array configuration may be changed from one polarization to another polarization. In another embodiment, when the environment changes, the configuration tables 903 and 905 are updated to reflect the change.

Following is an example implementation of beam acquisition and tracking discussed with reference to the various figures. The implementation described below is not intended to be limiting and is merely one example of implementation for purposes of discussion.

As noted above, beam acquisition establishes the initial beam configuration between corresponding devices (e.g., gNB 202 and UE 110), enabling the devices to initiate communications, such as an mmWave band communication. After the gNB 202 and UE 110 have established communication, the UE 110 may use information provided by the sensors to determine the particular environment (e.g., free space, BHHR, BHHL, HL, HR, etc.) in which the UE 110 is operating. Once an operating environment change has been determined, a new configuration table corresponding to the new environment is loaded. The phased array antennas are selected and configured with the same index ($\theta$, $\varphi$) to the newly loaded configuration table.

During the beam searching procedure, a sequence of training beams is sent to the UE 110 from the gNB 202. Each of the training beams is configured to a specific direction and is received by the UE 110. In one embodiment, the UE antenna pattern is configured to be omni-directional, as shown for example in FIG. 5A. In another embodiment, if the UE 110 has multiple phased array antennas, only the antennas listed in the configuration table (for the specific environment) will be configured for each direction, where UE 110 may use the senor information to determine the environment. For example, if the UE 110 determines that a user hand blocks two of the antennas (based on the sensor information), the UE 110 will use other antennas except the two blocked antennas during beam searching/alignment procedure. The UE 110 will use all available beam (covering all intended directions) to receive the training beams and report the received training beams ID or the beams having the strongest signal back to gNB 202. For example, if the gNB 202 is configured to sixteen different directions (sectors) and the UE 110 has six available antennas, the gNB 202 will send ninety-six training beams (16 directions×6 antennas, where 16 training beams are sent for each of the six antennas). Upon receipt of the training beams, the UE 110 will report the training beam having the best quality (strongest signal), or a few beams with highest signal quality. In this example, and for purposes of discussion, the UE 110 reports training beam 2 (sector 2) and antenna 2 as having the best quality. After the UE 110 reports the best quality beams back to the gNB 202, the gBN 202 may begin to transmit using the best quality beams when sending signals to UE110, and the UE 110 may begin to receive using the corresponding receive beam or do beam fine alignment.

During the beam searching/alignment procedure, UE 110 may configure an omni-directional array, or use a list of beams from the configuration table. The configuration table used in beam searching/alignment could be the same as the table used in tracking state. The configuration table used in the beam searching/alignment could be different, covering all directions with a coarse resolution in ($\theta$, $\varphi$) space, or covering a limited direction because some phased antenna array is deemed unusable in that environment. After completion of alignment, the UE 110 may load the configuration table corresponding to tracking state, as shown in FIGS. 8 and 9. For example, if the UE 110 is being held by a right hand against the head (BHHR), the configuration table corresponding to the BHHR environment (use case) will be loaded. In one embodiment, as the gNB 202 is now transmitting using the reported best beam, the UE 110 will search through the determined configuration table for all possible directions ($\theta$, $\varphi$) when an omni-directional pattern is used in beam searching/alignment stage In another embodiment, where UE 110 uses a list of the available beam in searching/alignment state, while gNB 202 is transmitting using the reported beam, UE 110 will search through the neighborhood of the receive beam ($\theta 0$, $\varphi 0$). For example, as shown in FIG. 8, two directions are depicted—($\theta 1$, $\varphi 1$) and ($\theta 2$, $\varphi 2$). For purposes of discussion, we assume that a first direction is (30, 15), in which the antenna has an index #1 and a predetermined phased array configuration 1 and a second direction (45, 90), in which the antenna has an index #2 and a predetermined phased array configuration 2. Between the two directions, the UE 110 will determine the best direction based on search results using signal quality or signal strength criteria. For example, the first direction in which the phased array has a configuration 2 is selected as the best direction (indicated by the arrow) based on the determined signal quality or strength.

The UE 110 may then begin the fine alignment procedure by configuring the phased array antennas to the determined best direction with the best antenna as defined in the configuration table. For example, if the UE 110 achieves the highest signal quality in the (45, 90) direction with antenna #2, the UE 110 will select antenna 2 and configure it to use the predetermined phased array configuration as indicated in the configuration table. In one embodiment, additional alignment between the gNB 202 and UE 110 may be implemented by fine tuning the beam direction.

After beam searching and refinement has been implemented, the UE 110 begins beam tracking. As discussed above, beam tracking refers to updating the beam configuration between the UE 110 and gNB 202 to keep the best beam alignment. The beam tracking depends on the radio channel condition between base station and UE 110, the relative motion and orientation of UE 110. If the channel coherent time (during which channel is assumed be static and beam direction remains the same) is long enough, the motion/orientation information will be used to maintain the tracking state. The channel coherent time determines on how frequently motion/orientation information should be provided. The channel coherent time could be derived by the speed of UE 110, which could be estimated for example by a GPS sensor. Based on the previously implemented procedures, the UE 110 is aware of the phased array antenna configuration and incoming beam direction. For example, and following the above example, the UE 110 is aware that the strongest signal is coming from direction (45, 90).

When the UE 110 changes orientation (e.g., rotates), the UE 110 can determine the change of orientation (Δθ, Δφ) based on sensor information provided by the sensors in the UE 110. Based on the original (or previous) orientation (θ, φ) and the new orientation (Δθ, Δφ), the UE 110 can calculate the previous beam direction as (θ−Δθ, φ−Δφ). For example, if the UE 110 rotates (30, 0) in a coordinate system fixed to the gNB 202, the (45, 90) direction in the UE's 110 coordinate system will be (15, 90) direction ((45−30), (90−0)=(15, 90)), which remains the (45, 90) in the coordinate system fixed to gNB 202. The UE 110 may then use the new direction (θ−Δθ, φ−Δφ) to configure the antenna. In one embodiment, configuring the antenna involves antenna switching. In another embodiment, the UE's orientation change is within the plane perpendicular to the incoming beam direction. For this case, the same index (θ, φ) to the configuration table will appear, while an phased array configuration for different polarization could be used if the changes of orientation is beyond a threshold.

FIGS. 10A-10C illustrate flow diagrams of beam steering according to various aspects of the disclosed embodiments. In the discussion that follows, the procedures disclosed are implemented by the user equipment. However, it is appreciated that implementation is not limited to the user equipment and that any system and/or component described with reference to FIGS. 1-3, 5A-5C, 6A-6B, 11A-11B and FIG. 12 may be employed to implement that procedures.

With reference to FIG. 10A, the user equipment (e.g., UE 110) will initially determine the environment (use case) from sensors based within the UE 110, configure the phased array antenna pattern using the antennas available based the determined environment. To expedite the searching/alignment procedure, the phased array antenna beam could be omni-directional or only covering limited directions or with a limited number of antennas. The UE 110 will search through a list of available beams and determine the best beam direction from the base station side. At 1002, the UE 110 will then configure one or more antennas with a beam directed to a first beam direction based on a configuration from a configuration table corresponding to an environment. At 1004, the UE 110 identifies a change in direction of the beam in response to a change in orientation. The change in orientation is determined, for example, based on the sensor(s) in the UE 110. Upon identifying a change in the direction of the beam, a second beam direction is calculated by the UE 110 at 1006. The second beam direction is based on the first beam direction and the change in orientation of the user equipment, as described above and illustrated, for example, in FIG. 5C. At 1008, the UE 110 configures the phased array antennas by steering the first (prior) beam direction to the second beam direction to compensation for the change in orientation of the UE 110. In one embodiment, configuring the phased array antennas to the second beam direction includes switching from one of the phased array antennas to another of the phased array antennas.

Turning to FIG. 10B, at 1010, the environment may be determined by the UE 110 based on sensor information provided by the sensors in the UE 110. The environment detected may include, as noted above but not limited to, placement in open space of the UE 110, placement of hands or other human body parts, such as the head, on the UE 110, obstructions that degrade performance levels of the antenna, etc. Based on the determined environment, the UE 110 selects and configures a pattern of the phased array antennas at 1012. Subsequently, a sequence of training beams is received from the gNB 202 on the selected phased array antennas and the training beams with the strongest signal are reported back to the gNB 202 at 1014. In one embodiment, the information provided by the sensors identifies which of the phased array antennas on the UE 110 are blocked such that the performance level (e.g., signal quality) falls below a threshold.

In FIG. 10C, at 1016, the UE 110 loads a configuration table with the configurations including the strongest signals associated with the various environments (e.g., for the environment in which the user equipment is being held by a right hand, a configuration table is loaded with corresponding configurations). The UE 110 then searches the configuration table associated with the environment for beam directions of the phased array antennas at 1018, and determines a best beam direction for each of phased array antennas based on at least one of signal quality or strength at 1020. In one embodiment, the best beam direction is determined for a phase-shifter and an amplifier gain for each of the phased array antennas. In another embodiment, the UE 110 updates the configuration in the configuration table to include the second beam direction corresponding to the environment.

Figure 11A:
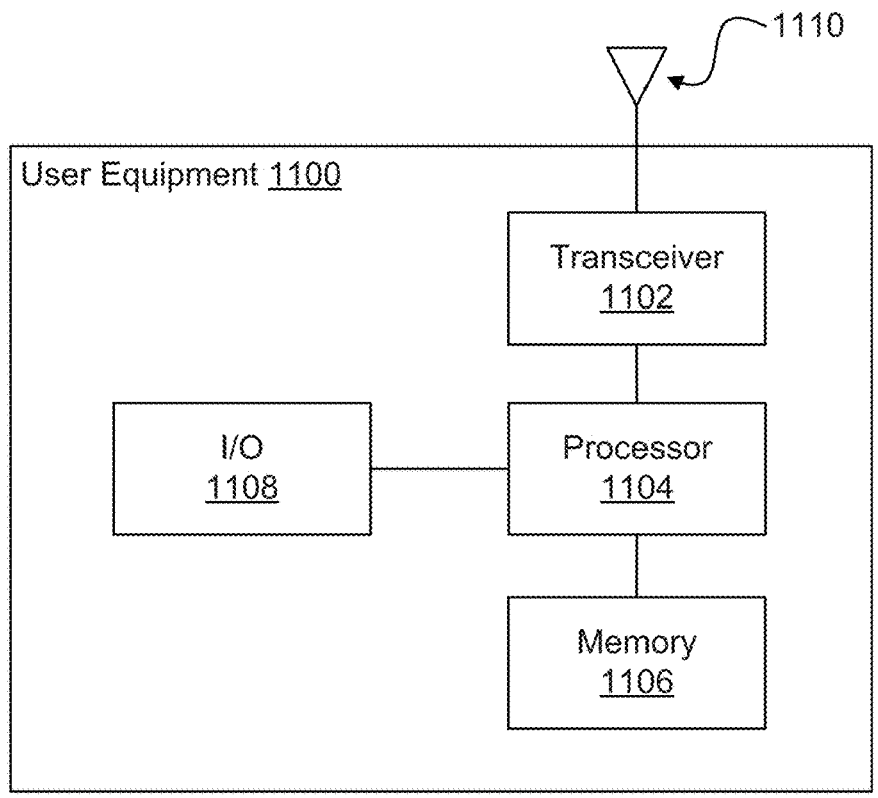
FIG. 11A illustrates example user equipment that may implement the methods and teachings according to this disclosure.

FIG. 11A illustrates example user equipment that may implement the methods and teachings according to this disclosure. As shown in the figure, the UE 1100 includes at least one processor 1104. The processor 1104 implements various processing operations of the UE 1100. For example, the processor 1104 may perform signal coding, data processing, power control, input/output processing, or any other functionality enabling the UE 1100 to operate in the system 100 (FIG. 1). The processor 1104 may include any suitable processing or computing device configured to perform one or more operations. For example, the processor 1104 may include a microprocessor, microcontroller, digital signal processor, field programmable gate array, or application specific integrated circuit.

The UE 1100 also includes at least one transceiver 1102. The transceiver 1102 is configured to modulate data or other content for transmission by at least one antenna 1110. The transceiver 1102 is also configured to demodulate data or other content received by the at least one antenna 1110. Each transceiver 1102 may include any suitable structure for generating signals for wireless transmission and/or processing signals received wirelessly. Each antenna 1110 includes any suitable structure for transmitting and/or receiving wireless signals. It is appreciated that one or multiple transceivers 1102 could be used in the UE 1100, and one or multiple antennas 1110 could be used in the UE 1100. Although shown as a single functional unit, a transceiver 1102 may also be implemented using at least one transmitter and at least one separate receiver.

The UE 1100 further includes one or more input/output devices 1108. The input/output devices 1108 facilitate interaction with a user. Each input/output device 1108 includes any suitable structure for providing information to or receiving information from a user, such as a speaker, microphone, keypad, keyboard, display, or touch screen.

In addition, the UE 1100 includes at least one memory 1106. The memory 1106 stores instructions and data used, generated, or collected by the UE 1100. For example, the memory 1106 could store software or firmware instructions executed by the processor(s) 1104 and data used to reduce or eliminate interference in incoming signals. Each memory 1106 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 11B:
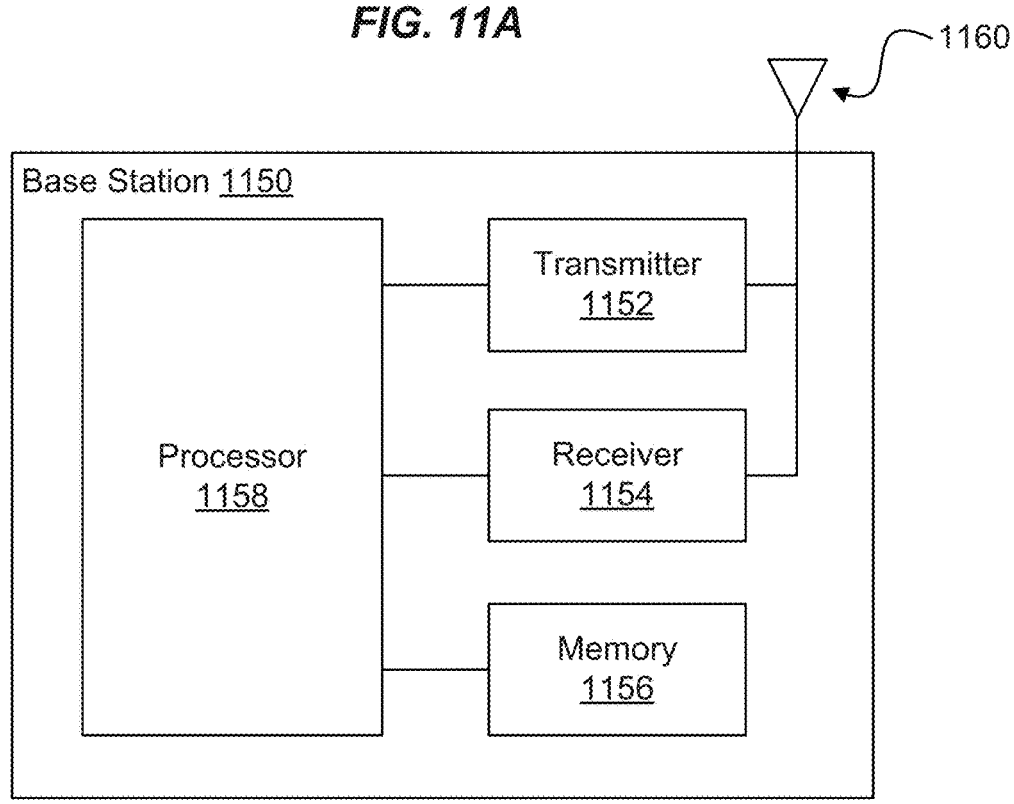
FIG. 11B illustrates example base station that may implement the methods and teachings according to this disclosure.

FIG. 11B illustrates example base station that may implement the methods and teachings according to this disclosure. As shown in the figure, the base station 1150 includes at least one processor 1158, at least one transmitter 1152, at least one receiver 1154, one or more antennas 1160, and at least one memory 1156. The processor 1158 implements various processing operations of the base station 1150, such as signal coding, data processing, power control, input/output processing, or any other functionality. Each processor 1158 includes any suitable processing or computing device configured to perform one or more operations. Each processor 1158 could, for example, include a microprocessor, microcontroller, digital signal processor, field programmable gate array, or application specific integrated circuit.

Each transmitter 1152 includes any suitable structure for generating signals for wireless transmission to one or more UEs or other devices. Each receiver 1154 includes any suitable structure for processing signals received wirelessly from one or more UEs or other devices. Although shown as separate components, at least one transmitter 1152 and at least one receiver 1154 could be combined into a transceiver. Each antenna 1160 includes any suitable structure for transmitting and/or receiving wireless signals. While a common antenna 1160 is shown here as being coupled to both the transmitter 1152 and the receiver 1154, one or more antennas 1160 could be coupled to the transmitter(s) 1152, and one or more separate antennas 1160 could be coupled to the receiver(s) 1154. Each memory 1156 includes any suitable volatile and/or non-volatile storage and retrieval device(s).

Figure 12:
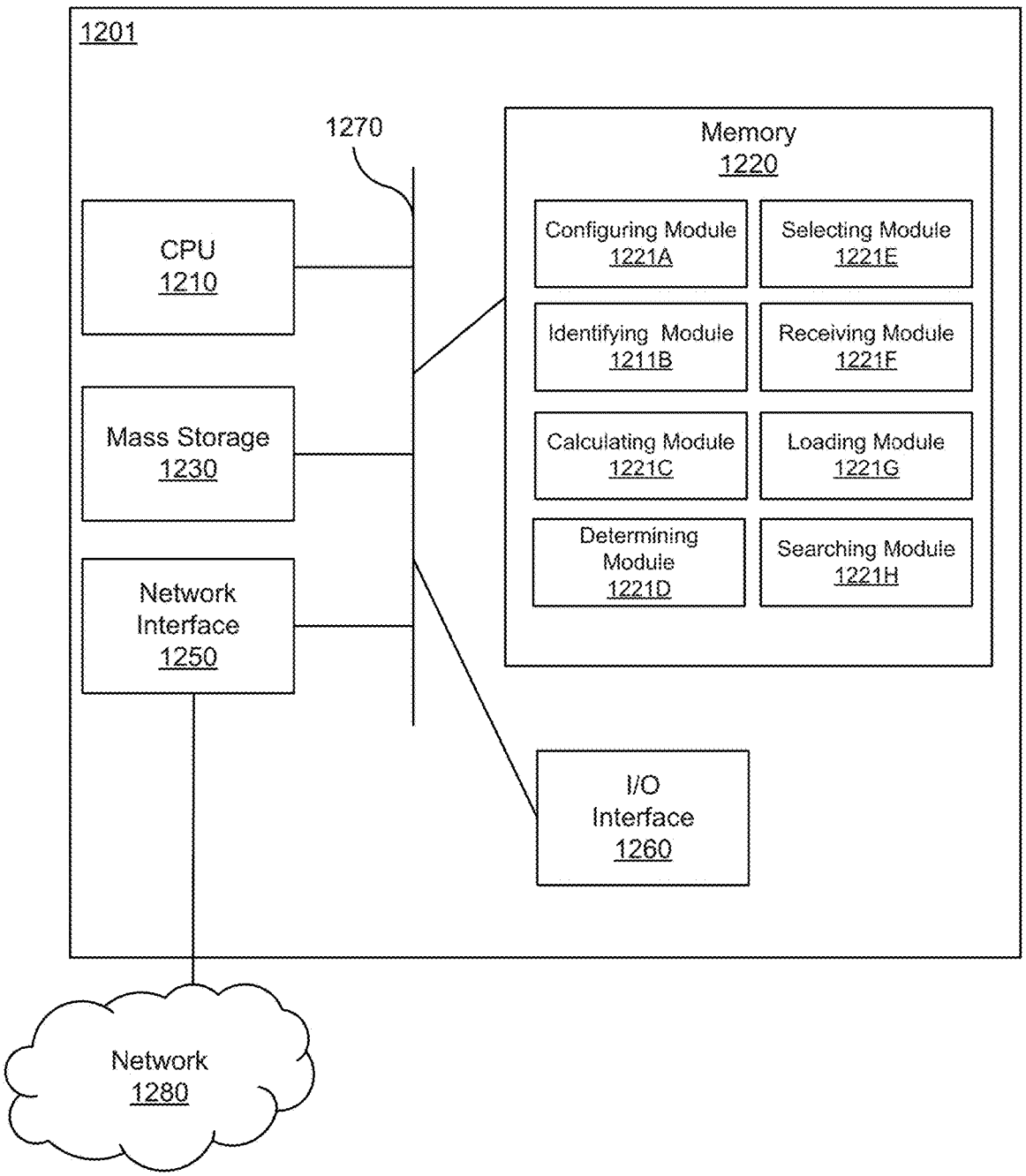
FIG. 12 illustrates a block diagram of a network system that can be used to implement various embodiments.

FIG. 12 is a block diagram of a network device that can be used to implement various embodiments. Specific network devices may utilize all of the components shown, or only a subset of the components, and levels of integration may vary from device to device. Furthermore, the network device 1200 may contain multiple instances of a component, such as multiple processing units, processors, memories, transmitters, receivers, etc. The network device 1200 may comprise a processing unit 1201 equipped with one or more input/output devices, such as network interfaces, storage interfaces, and the like. The processing unit 1201 may include a central processing unit (CPU) 1210, a memory 1220, a mass storage device 1230, and an I/O interface 1260 connected to a bus 1270. The bus 1270 may be one or more of any type of several bus architectures including a memory bus or memory controller, a peripheral bus or the like.

The CPU 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory 1220 may include ROM for use at boot-up, and DRAM for program and data storage for use while executing programs. In embodiments, the memory 1220 is non-transitory. In one embodiment, the memory 1220 includes a configuring module 1321A configuring one or more antennas with a beam directed to a first beam direction based on a configuration corresponding to an environment and configuring the one or more antennas by steering the beam to the second beam direction to compensate for the change in orientation of the user equipment, an identifying module 1321B identifying a change in direction of the beam in response to a change in orientation of user equipment, the change in orientation determined via one or more sensors in the user equipment, a calculating module 1321C calculating a second beam direction based on a the first beam direction and the change in orientation of the user equipment, a determining module 1321D determining the environment of the user equipment based on sensor information provided by the one or more sensors in the user equipment and a best beam direction for each of the one or more antennas based on at least one of signal quality or strength, a selecting module 1321 E selecting the one or more antennas based on the environment and configure a pattern of the selected one or more antennas, a receiving module 1221 F receiving a sequence of training beams from base station on the selected one or more antennas and reporting the training beams with the strongest signal back to base station, a loading module 1221G loading a configuration table with the configurations including the strongest signals associated with the environment and a searching module 1221H searching the configuration table associated with the environment for beam directions of the one or more antennas.

The mass storage device 1230 may comprise any type of storage device configured to store data, programs, and other information and to make the data, programs, and other information accessible via the bus 1270. The mass storage device 1230 may comprise, for example, one or more of a solid state drive, hard disk drive, a magnetic disk drive, an optical disk drive, or the like.

The processing unit 1201 also includes one or more network interfaces 1350, which may comprise wired links, such as an Ethernet cable or the like, and/or wireless links to access nodes or one or more networks 1280. The network interface 1250 allows the processing unit 1201 to communicate with remote units via the networks 1280. For example, the network interface 1250 may provide wireless communication via one or more transmitters/transmit antennas and one or more receivers/receive antennas. In an embodiment, the processing unit 1201 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for beam steering one or more antennas in an user equipment, comprising:
    determining, by the user equipment, an environment of the user equipment based on motion and proximity sensor information provided by one or more motion and proximity sensors in the user equipment, the environment specifying whether one or more antennas are blocked or detuned;
    configuring, by the user equipment communicating with a base station using a beam, one or more antennas to form the beam directed to a first beam direction based on a stored configuration corresponding to the environment, the configuration based on the environment;
    identifying, by the user equipment, a change in direction of the beam in response to a change in orientation of the user equipment in the environment, the change in orientation determined via the one or more motion and proximity sensors in the user equipment;
    calculating, by the user equipment, a second beam direction based on the first beam direction and a direction of the one or more antennas based on the change in orientation of the user equipment; and
    configuring, by the user equipment using the stored configuration, the one or more antennas to steer the beam to the second beam direction to compensate for the change in orientation of the user equipment in the environment.

2. The method of claim 1, further comprising:
    selecting, by the user equipment, the one or more antennas based on the environment and forming a receiving beam by configuring a radiation pattern of the selected one or more antennas; and
    receiving, by the user equipment, signals from a sequence of training beams from the base station on the selected one or more antennas and reporting signal strengths of the training beams back to the base station.

3. The method of claim 2, further comprising:
    searching, by the user equipment, the stored configuration stored in a configuration table associated with the environment for beam directions of the one or more antennas;
    loading, by the user equipment, a configuration for the one or more antennas associated with the beam direction; and
    determining, by the user equipment, a best beam direction for each of the one or more antennas based on at least one of signal quality or strength.

4. The method of claim 3, wherein the information provided by the one or more sensors identifies which of the one or more antennas on the user equipment are adversely affected by a surrounding environment such that a performance level change in the one or more antennas is identified.

5. The method of claim 4, wherein the performance level change corresponds to a new configuration for the one or more antennas and is reflected to the configuration table associated with the environment.

6. The method of claim 4, wherein the information provided by the one or more sensors identifies which of the one or more antennas on the user equipment are blocked such that the performance level falls below a threshold.

7. The method of claim 3, wherein the best beam direction is determined for a phase-shifter and an amplifier gain for each of the one or more antennas.

8. The method of claim 3, further comprising updating the stored configuration for the one or more antennas to include the second beam direction corresponding to the environment.

9. The method of claim 2, wherein the one or more sensors are at least one of motion sensors, proximity sensors, impedance sensors and radar sensors.

10. The method of claim 1, wherein configuring the one or more antennas to form the beam includes configuring a relative phase shift and gain of signals associated to each of the one or more antennas, and configuring the one or more antennas to the second beam direction includes switching from the one or more antennas to another of the one or more antennas.

11. The method of claim 1, wherein the user equipment is mobile when communicating with the base station.

12. The method of claim 1, further comprising detecting the change in direction of the beam in response to the change in orientation of the user equipment in the environment.

13. User equipment for beam steering to communicate with a base station, comprising:
a non-transitory memory storage comprising instructions; and
one or more processors in communication with the memory, wherein the one or more processors execute the instructions to:
determine an environment of the user equipment based on sensor information provided by one or more motion and proximity sensors in the user equipment, the environment specifying whether one or more antennas are blocked or detuned;
configure one or more antennas to form a beam used to communicate with the base station and directed to a first beam direction based on a stored configuration corresponding to the environment, the environment impacting performance of the one or more antennas;
identify a change in direction of the beam in response to a change in orientation of the user equipment in the environment, the change in orientation determined via one or more sensors in the user equipment;
calculate a second beam direction based on the first beam direction and a direction of the one or more antennas based on the change in orientation of the user equipment; and
configure the one or more antennas using the stored configuration to steer the beam to the second beam direction to compensate for the change in orientation of the user equipment in the environment.

14. The user equipment of claim 13, wherein the one or more processors further execute the instructions to:
select the one or more antennas based on the environment and form a receiving beam by configuring a radiation pattern of the selected one or more antennas; and
receive signals from a sequence of training beams from the base station on the selected one or more antennas and reporting signal strengths of the training beams back to the base station.

15. The user equipment of claim 14, wherein the one or more processors further execute the instructions to:
search for the stored configuration in a configuration table associated with the environment for beam directions of the one or more antennas;
load a configuration for the one or more antennas associated with the beam direction; and
determine a best beam direction for each of the one or more antennas based on at least one of signal quality or strength.

16. The user equipment of claim 15, wherein the information provided by the one or more sensors identifies which of the one or more antennas on the user equipment are adversely affected by a surrounding environment such that a performance level change in the one or more antennas is identified.

17. The user equipment of claim 16, wherein the performance level change corresponds to a new configuration for the one or more antennas and is reflected to the configuration table associated with the environment.

18. The user equipment of claim 16, wherein the information provided by the one or more sensors identifies which of the one or more antennas on the user equipment are blocked such that the performance level falls below a threshold.

19. The user equipment of claim 15, further comprising updating the configuration for the one or more antennas to include the second beam direction corresponding to the environment.

20. The user equipment of claim 13, wherein configuring the one or more antenna to the second beam direction includes switching the one or more antennas to another of the one or more antennas.

21. A non-transitory computer-readable medium storing computer instructions for beam steering on a user equipment communicating with a base station, that when executed by one or more processors, cause the one or more processors to perform the steps of:
determining, by the user equipment, an environment of the user equipment based on motion and proximity sensor information provided by the one or more motion and proximity sensors in the user equipment, the environment specifying whether one or more antennas are blocked or detuned;
configuring one or more antennas to form a beam used for the communicating and directed to a first beam direction based on a configuration corresponding to an environment, the environment impacting performance of the one or more antennas;
identifying a change in direction of the beam in response to a change in orientation of the user equipment in the environment, the change in orientation determined via one or more sensors in the user equipment;
calculating a second beam direction based on the first beam direction and a direction of the one or more antennas based on the change in orientation of the user equipment; and
configuring the one or more antennas to steer the beam to the second beam direction to compensate for the change in orientation of the user equipment in the environment.

22. The non-transitory computer-readable medium of claim 21, wherein the one or more processors further perform the steps of:
selecting the one or more antennas based on the environment and for a receiving beam by configuring a pattern of the selected one or more antennas; and
receiving signals from a sequence of training beams from the base station on the selected one or more antennas and reporting the training beams with the strongest signal back to the base station.

23. The non-transitory computer-readable medium of claim 22 wherein the one or more processors further perform the steps of:
loading a configuration table storing the stored configurations for the one or more antennas, the configuration table associated with the environment;
searching the configuration table associated with the environment for beam directions of the one or more antennas; and
determining a best beam direction for each of the one or more antennas based on at least one of signal quality or strength.

24. The non-transitory computer-readable medium of claim 23, wherein the one or more processors further perform the steps of:
updating the configuration for the one or more antennas to include the second beam direction corresponding to the environment.

* * * * *

UNITED STATES PATENT AND TRADEMARK OFFICE
CERTIFICATE OF CORRECTION

PATENT NO. : 11,190,953 B2  
APPLICATION NO. : 15/847703  
DATED : November 30, 2021  
INVENTOR(S) : He et al.

Page 1 of 1

It is certified that error appears in the above-identified patent and that said Letters Patent is hereby corrected as shown below:

On the Title Page

Item (57), Line 8, please replace "on a the first" with -- on a first --

In the Claims

Column 21, Line 55 (Claim 1, Line 1), please replace "in an" with -- in a --

Column 22, Line 26 (Claim 3, Line 2), please replace "configuation" with -- configuration --

Column 24, Line 6 (Claim 20, Line 2), please replace "antenna to" with -- antennas to --

Signed and Sealed this  
Eighth Day of March, 2022

Drew Hirshfeld  
*Performing the Functions and Duties of the  
Under Secretary of Commerce for Intellectual Property and  
Director of the United States Patent and Trademark Office*